United States Patent [19]
Kendall

[11] 3,711,080
[45] Jan. 16, 1973

[54] ENERGY ABSORPTION APPARATUS
[75] Inventor: Giles A. Kendall, Burbank, Calif.
[73] Assignee: Menasco Manufacturing Company, Burbank, Calif.
[22] Filed: July 19, 1971
[21] Appl. No.: 163,796

[52] U.S. Cl. ................267/116, 267/65 R, 293/89
[51] Int. Cl. .............................................F16f 9/30
[58] Field of Search......188/1 C; 293/DIG. 3, 70, 89; 267/116, 65 R

[56] References Cited

UNITED STATES PATENTS 3,588,076   6/1971   Ammerman........................267/65 R
3,659,835   5/1972   Peterson..............................267/136

Primary Examiner—Gerald M. Forlenza
Assistant Examiner—L. J. Oresky
Attorney—Robert E. Geauque

[57] ABSTRACT

An energy absorption apparatus including a piston being movably mounted within a cylinder, a sleeve forming the interior wall of the cylinder and being in contact with the piston, the sleeve having formed therein a plurality of longitudinal slots, a compressible solid material located within the cylinder and capable of passing from one side of the piston to the other side through the slots.

12 Claims, 13 Drawing Figures

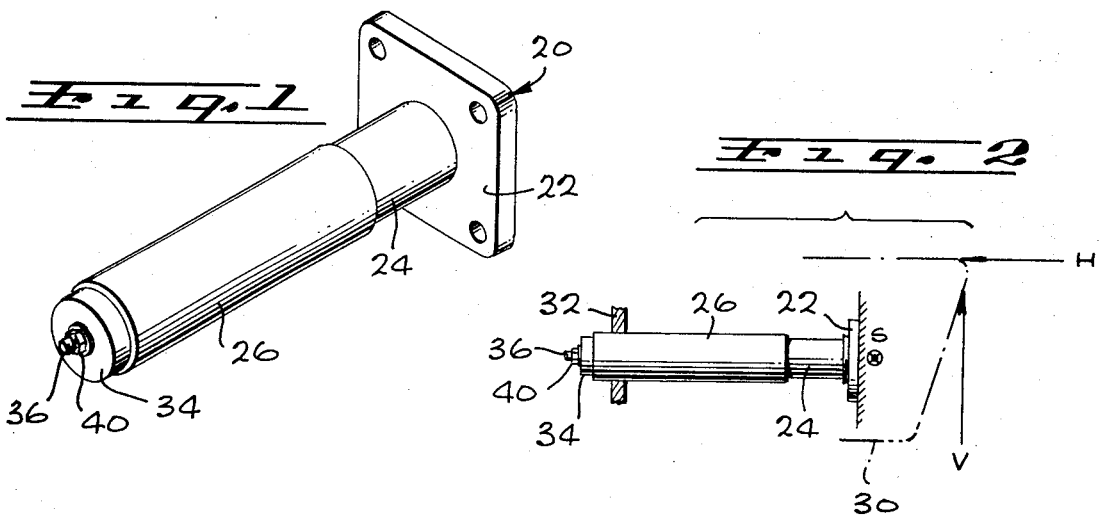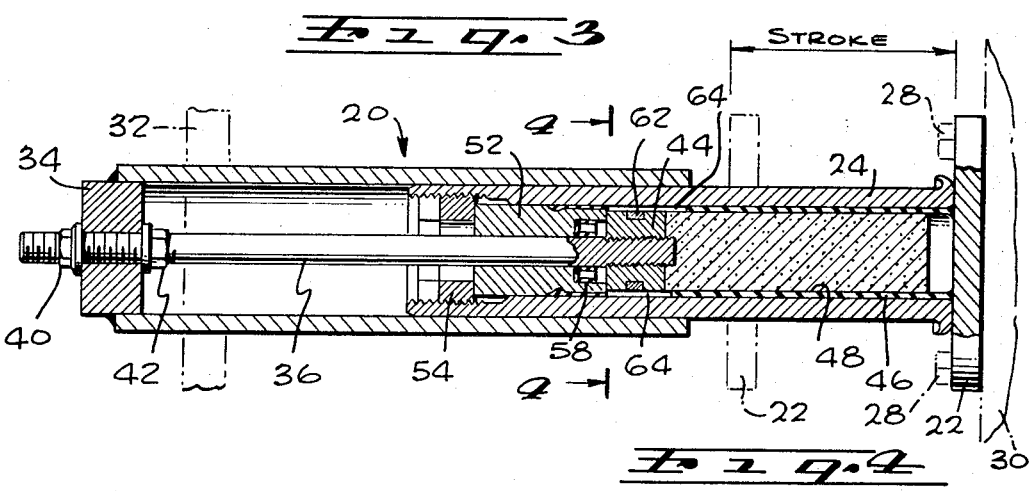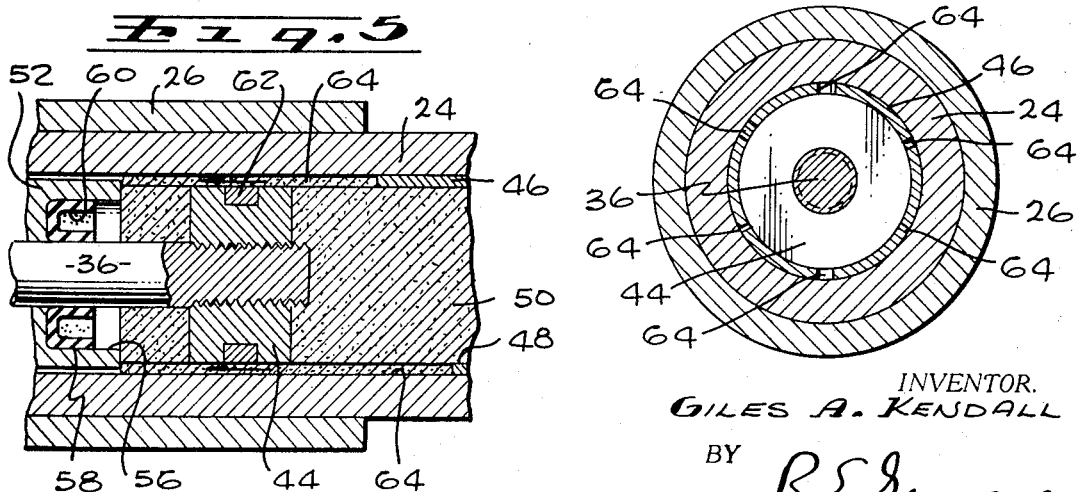

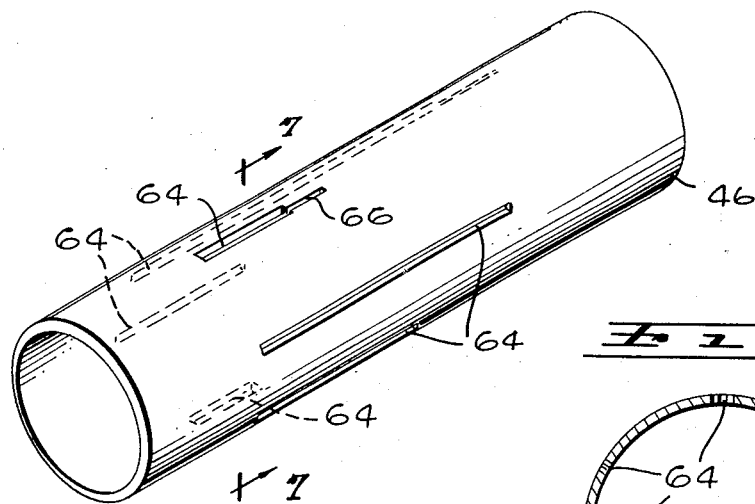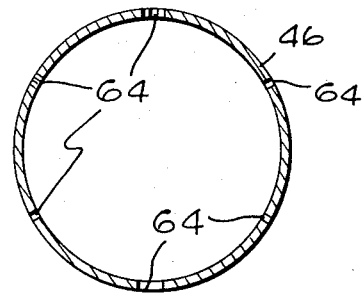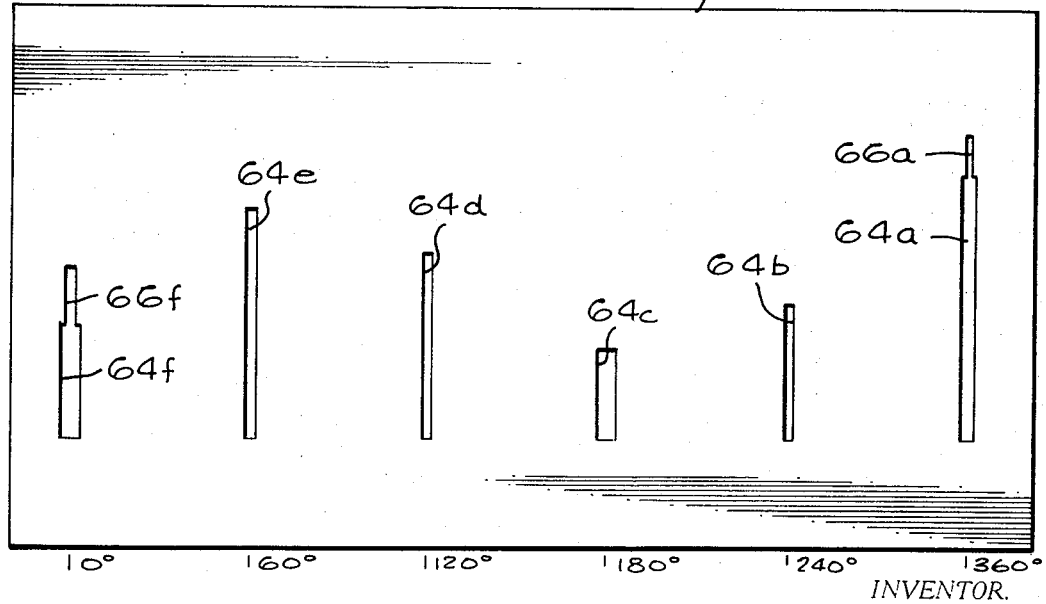

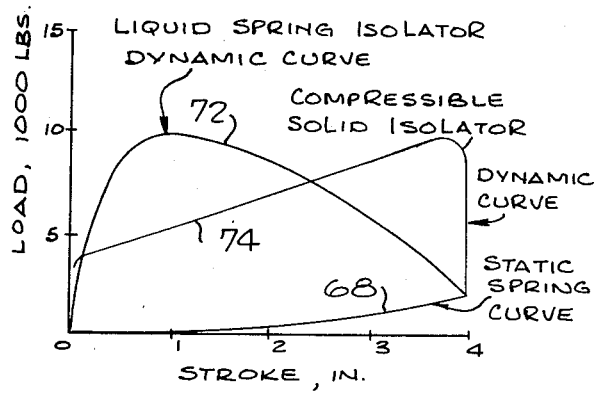
Fig. 9
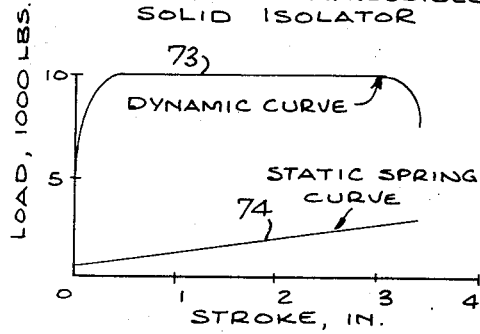
Fig. 10
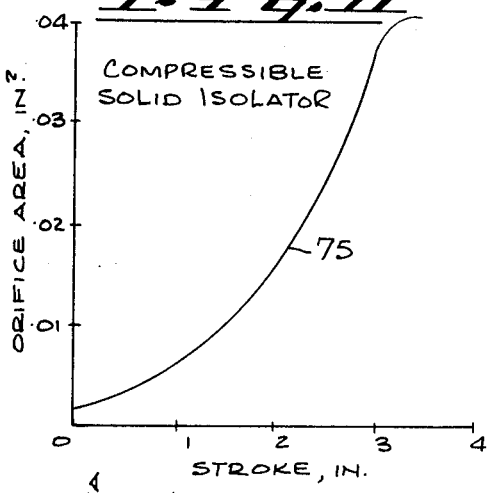
Fig. 11
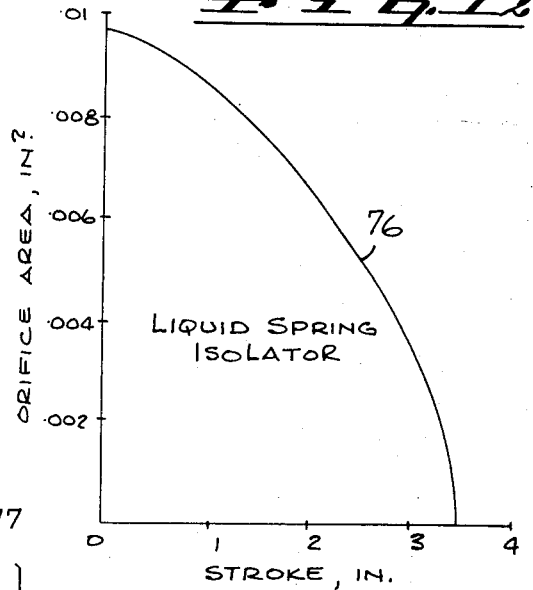
Fig. 12
Fig. 13
GILES A. KENDALL
INVENTOR.
BY R.E. Granger
ATTORNEY

ENERGY ABSORPTION APPARATUS

BACKGROUND OF THE INVENTION

The field of this invention relates to energy absorption apparatus and more particularly to a damped spring apparatus or shock isolator for an automobile bumper which employs the use of a compressible solid material.

Automobile bumpers are commonly formed of a rigid piece of material, such as steel, which is rigidly secured to the vehicle. Upon the vehicle being struck by another vehicle, or the vehicle striking a fixed object, the bumper material normally fails before failure of the automobile structure. Additionally, such bumpers normally directly transmit the impact force into the vehicle structure itself. Such transmission of the force is undesirable as such causes further damage to the vehicle as well as increasing the possibility of injury to the occupants of the vehicle.

Within the past few years an effort has been made to design a bumper for a vehicle which would absorb the impact force and not transmit an excessive force to the vehicle itself. Bumpers have been constructed of a plastic or similar flexible material which, upon being deformed, will return to its original state. Further, bumpers have utilized a fluid which, upon impact, is ejected through apertures within the bumper. The resistance to the ejecting of the fluid effects an absorption of the impact force. The major disadvantage of such fluid ejecting bumpers is that a relatively small amount of impact force will cause ejecting of the fluid from the bumper. Once the fluid has been lost, it is required that the bumper be refilled with fluid before it can be used again. This means that for a period of time, the bumper will be inoperative, and also time is lost and expense is required to effect the refilling of the bumper.

Heretofore, it has been known to employ the use of a damping apparatus in combination with the bumper to absorb the impact force. Such damping apparatuses have been known to take the form of either a spring damper or a fluid damper. In both the spring damper and the fluid damper, the damping force steadily increases as the length of stroke of the damper increases. In other words, maximum damping characteristics are not achieved until the end of the stroke of the damper. However, just the opposite is true of the impact force. That is, the force to be damped is largest initially with the force either being constant or steadily decreasing during the length of stroke of the damper.

SUMMARY OF THE INVENTION

The apparatus of this invention is constructed to mount an automobile bumper on its associated vehicle. However, it is to be understood that the present apparatus may be used in other environments, but it is particularly suitable for supporting and resisting movement of an automobile bumper. A piston rod is connected to the body of the vehicle with the piston rod terminating in a piston supported within a chamber formed within a housing. The housing is fixedly secured to the bumper of the vehicle. A sleeve is to be located within the housing between the piston and the housing. A plurality of longitudinal slots are located within the sleeve with the slots being adapted to permit flow of compressible solid within the cylinder from one side of the piston to the other side of the piston. The arrangement of slots is such that as the stroke of the piston increases, greater slot area becomes available to effect movement of the viscous material within the cylinder, from one side of the piston to the opposite side thereof. In other words, the energy absorption characteristics of the apparatus of this invention can remain substantially constant.

BRIEF DESCRIPTION OF THE DRAWINGS

FIG. 1 is an overall isometric view of the energy absorption apparatus of this invention;

FIG. 2 is a diagramatic representation of the apparatus of FIG. 1 as it would be installed to support a bumper of an automobile;

FIG. 3 is a longitudinal cross-sectional view through the apparatus of this invention in the initial position;

FIG. 4 is a cross-sectional view through the damping apparatus of this invention taken along line 4—4 of FIG. 3;

FIG. 5 is an enlarged fragmentary cross-sectional view of the apparatus of this invention showing the apparatus in a intermediate damping position;

FIG. 6 is an isometric view of the sleeve forming the interior surface of the cylinder;

FIG. 7 is a cross-sectional view through the sleeve of this invention taken along line 7—7 of FIG. 6;

FIG. 8 is a representation of the sleeve of FIG. 6 in a planar configuration so as to clearly show the longitudinal slot relationship;

FIG. 9 is a load-stroke diagram comparing a conventional liquid spring type of damping apparatus (isolator) with a compressible solid type of damping apparatus.

FIG. 10 is a load-stroke diagram showing the functional characteristics of a typical compressible solid type of isolator of this invention;

FIG. 11 is an orifice area vs. stroke diagram of a compressible solid isolator of this invention;

FIG. 12 is a diagram similar to FIG. 11 except for a conventional spring isolater; and FIG. 13 is a representation of both a load diagram and an orifice-area diagram for a particular slot arrangement included within the apparatus of this invention.

DETAILED DESCRIPTION OF THE SHOWN EMBODIMENT

Referring particularly to the drawings, there is shown in FIG. 1 the energy absorption apparatus 20 (also referred to herein as shock isolator) of this invention being basically composed of attaching flange 22, and a movable housing 26 being telescopingly mounted about the cylinder housing 24. The attaching flange 22 is adapted to be fixedly secured by bolts 28 to a bumper 30 of an automobile. The movable housing 26 is to be fixedly secured to the body 32 of the vehicle. However, it is to be understood that the attaching flange 22 could be secured to the body of the vehicle with the movable housing 26 being secured to the bumper. Additionally, in other environments, the apparatus 20 of this invention could be employed where the movable housing 26 would be secured to one member with the attaching flange 22 being secured to another relatively movable member.

Referring particularly to FIG. 2 of the drawings, the apparatus 20 of this invention is designed to primarily damp the horizontal component "H" of the impact force. However, also, the apparatus 20 of this invention is designed to incur a certain amount of vertical force "V" and also a certain amount of side load "S." The allowable loading condition with the apparatus 20 of this invention having a 2-inch stroke is about 5,000 pounds horizontal force H, 750 pounds vertical force V, and 2500 pounds, side load S.

Fixedly secured within the free end of the movable housing 26 is a plug 34. Fixed within the plug 34 is a piston rod 36. The piston rod 36 is to be longitudinally adjustable with respect to the plug 34 by means of threads 38 and nuts 40 and 42.

The free end of the piston rod 36 is fixedly secured to piston 44. The piston 44 is slidable movable within a sleeve 46. A seal 62 is located within the piston 44 and maintains such in a fluid tight relationship with respect to the sleeve 46. The sleeve 46 is snugly positioned within the cylinder housing 24. The volume defined within the sleeve 46 and located between the attaching flange 22 and the head of the piston 44 is a chamber 48. A compressible solid material 50 is to be located within the chamber 48 and a wide variety of compositions of material 50 could be employed within the chamber 48 as discussed in U.S. Pat. No. 3,053,526. One such material is commercially available from Dow-Corning Corporation under the trade name "Silastic." The advantages in the use of a compressible solid material rather than a liquid are also discussed in said patent. Upon the piston 44 moving into the chamber 48, an increase in the pressure of material 50 occurs due to the volume which is taken up by the piston rod 36. This increase spring force causes an automatic return of the piston 44 after the stroking of the piston as the result of impact on the bumper 30. Thus, the vehicle bumper automatically moves back to the position prior to impact, thereby making it ready to incur another impact force.

Chamber 48 is blocked off at the free end thereof by a plug 52. The position of the plug 52 is controlled by means of a nut 54 which is threadably mounted within the cylinder housing 24 and in abutting contact with the plug 52. An annular recess 56 is formed within the plug 52 and is adapted to cooperate to retain seal 58. Seal 58 also includes an annular recess 60. As the pressure of the viscous material 50 increases (during the stroke of the piston 44), the material 50 passes into annular recess 56 and then into annular recess 60. The compressive force of the material 50 then pushes the seal 58 into tighter engagement with the piston rod 36. Therefore, as the force within the material 50 increases, so does also the sealing force to prevent leakage of the material 50 exteriorly of the chamber 48.

Formed in the sleeve 46 are a plurality of longitudinal slots 64, designated separately as 64a–64f. Each of the slots 64 are preferably equidistantly spaced apart about sleeve 46. Also, it is to be noted that the slots 64 can be of different longitudinal lengths, with the piston 44 being adapted to cooperate first with the longest slot 64a, then the next longest slot 64e, etc., until finally the piston 44 cooperates with all the slots 64. It is the function of each of the slots 64, as the piston 44 moves through its damping stroke, for the compressible material 50 to be conducted through the slots 64 to the opposite side of the piston. The resistance to the movement of the compressible solid material from one side of the piston to the other side of the piston determines the damping characteristics of the apparatus 20.

It is to be noted that some of the slots 64a–64f include a smaller width section 66a and 66f, respectfully. It should be readily apparent that a greater resistance to flow of the material 50 is caused by the smaller width sections 66. The reason for these sections 66 is so that the energy absorption characteristics of the apparatus can be more precisely adjusted to produce a desired load-stroke relationship.

The operation of the energy absorption apparatus 20 of this invention will now be described. Assuming that the piston 44 is in the initial position shown in FIG. 3 of the drawings, an impact force upon the bumper 30 causes the movable housing 26 to move along the cylinder housing 24. As a result, the piston 44 moves within the sleeve 46 compressing the material 50 within the chamber 48 The narrow width section 66 of the longest longitudinal slot 64a is first uncovered by the piston 44 and permits passage of a portion of the material 50 from one side of the piston 44 to the opposite side of the piston 44. Because this is the only active orifice at this given moment, substantial energy absorption occurs. As the piston 44 continues to move along in the stroke, other slots 64 are uncovered by the piston 44 allowing flow of the material 50 from one side of the piston 44 to the opposite side thereof. After absorption of the impact force by means of damping apparatus 20, the increased pressure produced within the material 50, due to the displaced volume of the material 50 caused by the movement of the piston rod 36 within chamber 48, causes the piston 44 to move back to its initial position shown in FIG. 3 of the drawings.

FIG. 9 provides a comparison of the functional characteristics of a compressible solid shock isolator (spring damper) and a liquid spring shock isolator, each of which utilizes a single orifice of fixed size for damping. Curve 72 is the dynamic curve for the liquid spring isolator and curve 74 is the dynamic curve for the compressible solid isolater. It is noted that the static spring curve 68 is the same for both isolaters. The areas under curves 72 and 74 are equal so that both isolaters have equal energy absorption capability. It is to be noted that the dynamic curve 72 for the liquid spring isolater shows greater energy absorption over the initial portion of the stroke, whereas the dynamic curve 74 for the compressible solid isolater shows greater energy absorption at the end of the stroke. Thus, it has been determined that the dynamic characteristics of a compressible solid isolater are substantially different from the dynamic characteristics of a liquid spring isolater. The reason for this is not fully understood although it appears that the shear strength of the compressible solid 50 increases with increase in pressure of the material as the piston stroke increases and therefore, the material 50 offers more and more resistance to piston movement as piston displacement increases even though the velocity of movement of the piston is decreasing.

FIG. 10 illustrates the typical characteristic for a compressible solid isolater of the present invention utilizing the metering sleeve and having a permitted maximum load of 10,000 lbs. The dynamic curve 73 is approximately constant at this maximum load over most of the stroke in order to obtain maximum efficiency of energy absorption. It is noted that the static spring curve 74 has substantially the same shape as the curve 68.

Referring to FIG. 11, in order to obtain the dynamic curve 73 of FIG. 10 for a compressible solid isolater, the area of the orifice must change with stroke as illustrated by curve 75 of FIG. 11. On the other hand, FIG. 12 shows the variation in orifice area with stroke for a liquid spring isolater to produce a dynamic curve of similar shape to that of curve 73 of FIG. 10. Therefore, in order to produce the curve 73 in a compressible solid isolater, it is necessary to continuously enlarge the orifice area as the piston strokes inwardly, even though the velocity of the piston is continuously decreasing. In a liquid spring, the orifice area must continuously decrease in order to produce a corresponding damping characteristic similar to curve 73 of FIG. 10.

Referring to FIG. 13, the load vs. stroke curve 76 actually represents a slot arrangement similar to FIG. 8 of the drawings. It is to be noted that the orifice area vs. stroke curve 77 represents a steady increase in the effective slot area as the length of the stroke increases. It is also to be noted that the energy absorption, represented by curve 76, approaches the value of the maximum allowable impact load represented as 10,000 lbs. The effective slots 64 and 66 at any piston position are designated on curve 77 which demonstrates the increase in slot area as the stroke increases. By adjusting the width and position of the damping slots in the sleeve, the damping load of the slots can be varied to produce a dynamic load vs. stroke curve which approaches a horizontal line at the maximum permissible dynamic load value. In general, the slot area increases with the stroke throughout the stroke length and the slope and shape of the area curve will depend upon the particular spring damper and sleeve construction.

The present invention, by selecting the position and width of the slots 64 and 66 in the sleeve, provides a damper having any desired energy absorption characteristics.

By initially limiting orifice size and then steadily increasing orifice size over the length of the stroke, near maximum energy absorption can be obtained. Also, it is possible to vary the slots to reduce the slot area during some portion or portions of the stroke, although it is apparent that the total slot area will be greater at this end of the stroke than at the beginning of the stroke. While the slots are conveniently located in a sleeve which is separate from the cylinder wall, it is apparent that the slots could be formed as grooves in the cylinder wall when no sleeve is utilized.

What is claimed is

1. An energy absorption apparatus comprising:
a piston connected to a piston rod;
a cylinder, said piston being longitudinally movable within said cylinder adjacent the inner wall thereof;
a compressible solid material located within said cylinder and pressurized to normally position said piston at one end of said cylinder in retracted position;
said piston rod moving into said cylinder as said piston moves towards its extended position; and
passage means in said inner wall of said cylinder to permit said material to move from one side of said piston to the other side upon movement of said piston within said cylinder, the flow area of said passage means increasing throughout the stroke of said piston.

2. An apparatus as defined within claim 1 wherein said passage means includes at least one longitudinal slot formed within said inner wall of said cylinder.

3. Apparatus as defined within claim 2 wherein said slot extends longitudinally of said cylinder and is variable in width.

4. Apparatus as defined within claim 1 wherein said cylinder inner wall comprises a sleeve inserted into said cylinder and containing said passage means.

5. An apparatus as defined in claim 1 wherein said passage means includes a plurality of longitudinal slots formed within said inner wall of said cylinder.

6. An apparatus as defined within claim 5 wherein each of said slots are of a different longitudinal length, said slots being adapted to successively be uncovered by said piston upon movement of said piston within said cylinder.

7. An apparatus as defined in claim 5 wherein a plurality of said slots are uncovered by said piston at said extended position to produce maximum slot area.

8. An apparatus as defined within claim 7 wherein at least one of said slots being variable in width, the narrow end of said slot being located at said retracted position for minimum damping.

9. An apparatus as defined within claim 4 wherein said passage means comprises a plurality of longitudinal slots which are successively uncovered by said piston as it moves toward said extended position, thereby progressively increasing the total uncovered slot area as the piston moves from the retracted position to the extended position.

10. An apparatus as defined within claim 9 wherein said slots being equiangularly spaced about said sleeve.

11. An apparatus as defined within claim 9 wherein each of said slots being of a different longitudinal length.

12. An apparatus as defined within claim 10 wherein at least one of said slots being variable in width, the smallest width of said variable width slot to communicate with said piston prior to communication of the larger width of said slot.

* * * * *